Nov. 15, 1955  R. POLK, JR  2,723,823
BRACKET FOR SUN VISOR
Filed July 16, 1953
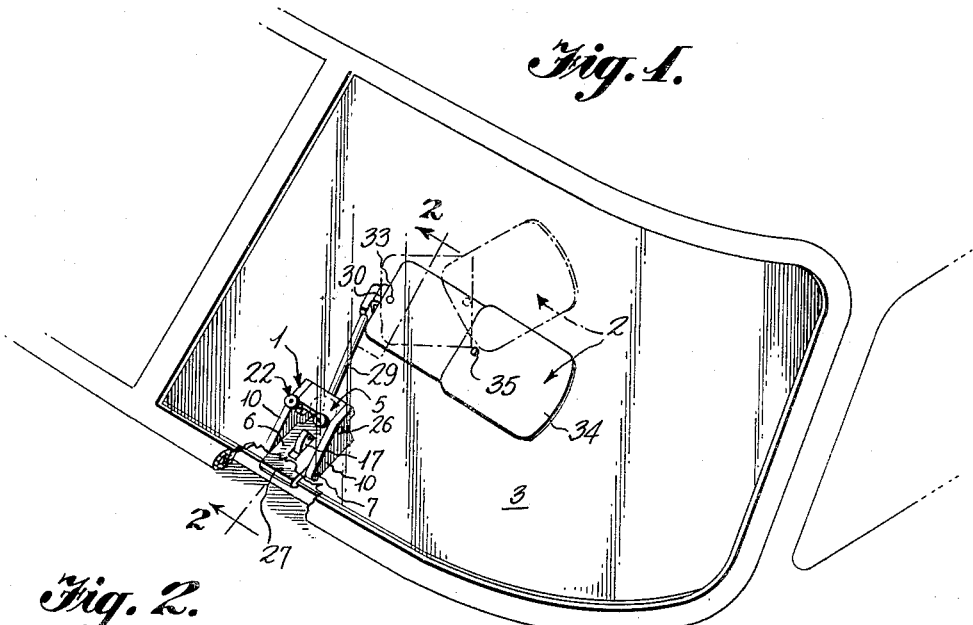
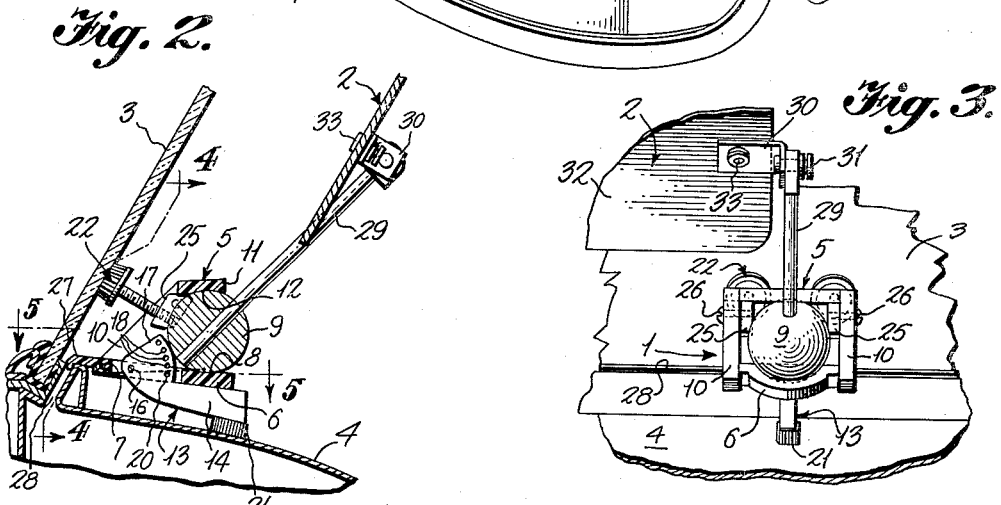
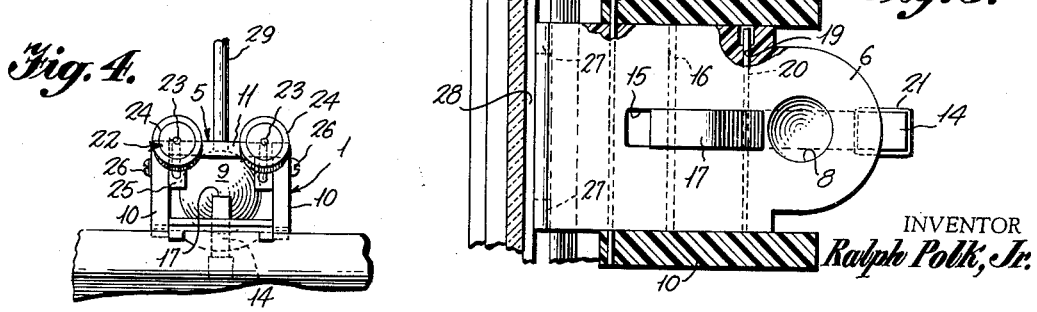
INVENTOR
Ralph Polk, Jr.
BY Mason, Fenwick & Lawrence
ATTORNEYS

United States Patent Office 2,723,823
Patented Nov. 15, 1955

2,723,823
BRACKET FOR SUN VISOR
Ralph Polk, Jr., Tampa, Fla.

Application July 16, 1953, Serial No. 368,429

5 Claims. (Cl. 248—226)

This invention relates to clamps, and more particularly to clamps for gripping connection between confronting surfaces of members forming a dihedral angle, to form a mounting means for devices of various kinds. The invention is particularly adaptable for use in demountably securing various attachments to automobiles.

Most automobile attachments have been permanently secured to the car, or attached by means of clamps to the steering column, or by vacuum cups to other flat surfaces of the interior. A demountable securing means is desirable, as it may be necessary to move the attachment from time to time. Although vacuum cups permit removal, they will not adhere to a surface over long periods of time, and they do not have the rigidity required for many attachments.

The object of the present invention is to provide a mounting means which may be quickly attached or removed, and which will hold an attachment rigidly in place.

Another object is the provision of a clamp which may be secured within a dihedral angle, and in which the clamping pressure exerted against the confronting surfaces of the dihedral angle will react against the attachment, with which the mounting means is to be used, to rigidly secure the attachment to the clamp.

Yet another object is to provide a clamp of this type which may be securely fastened in place and yet permit free movement of the attachment relative thereto.

A further object is to provide a device of this nature which is readily adjustable for clamping attachment to dihedrals over a wide range of angles.

Another object is the provision of the clamp which may be secured in places which have been inaccessible for mounting means of other kinds.

Other objects of the invention will become apparent from the following description of one practical embodiment thereof when taken in conjunction with the drawings which accompany, and form part of, this specification.

In the drawings:

Figure 1 is a perspective view of the exterior of an automobile windshield and associated parts, showing a clamp embodying the principles of the present invention, secured in position and supporting a glare-shield;

Figure 2 is a vertical, sectional view, taken through the clamp and associated portions of the automobile, and is taken substantially on the line 2—2 of Figure 1.

Figure 3 is a rear view of the clamp, the glare-shield and portions of the automobile dash and windshield;

Figure 4 is a front view of the clamp and the glare-shield; and,

Figure 5 is a horizontal section, taken on the line 5—5 of Figure 2.

In general, the invention consists of a clamp which is formed of two arms pivotally joined at their ends for adjustment to various angular positions for engagement with the confronting surfaces of members forming a dihedral angle, with the pressure exerted against the surfaces of the dihedral reacting in an opposite direction to grip between the free ends of the arms an attachment to be supported by the clamp. Although the invention will be described in connection with mounting an attachment in an automobile, it will be understood that this is merely by way of example, and that the clamp will have many other uses.

Referring to the drawings in detail, there is shown a clamp 1, constructed in accordance with the present invention, supporting a glare-shield 2 and mounted in the dihedral angle formed between the windshield 3 and dash 4 of an automobile.

The clamp is formed of two sections, or arms, 5 and 6 which are pivotally connected at, or near, their ends, as at 7. The connection 7 is a free pivot so that the arms are freely movable relative to one another. The lower arm 6 is a relatively straight, flat member and is provided with a recess 8, near its free end, to seat a ball 9 which is fixed to the attachment which is to be supported by the clamp. The upper arm 5 comprises a pair of parallel, spaced side members 10, which are bridged at their upper free ends by means of a cross member 11. The bridge, or cross member, 11 is provided with a recess 12, similar to the recess in the lower arm, adapted to seat the upper portion of the attachment ball 9. It will be obvious that by moving the two arms toward one another to decrease the angle between them, pressure will be put upon the ball 9 to frictionally hold it in the recesses 8 and 12. The degree of pressure will determine the rigidity of the ball with regard to the clamping arms.

It has been found that by making the recesses relatively large, the recess edges will grip the ball closer to its center line, increasing the frictional contact between the arms and the ball. If the recesses are bevelled on the inside just sufficiently to dig slightly into the surface of the ball, the ball may be held rigidly in place with minimum pressure. It is preferred to make the ball of some resilient material, such as rubber or cork, so that the edges of the recess may deform the surface of the ball with slight pressure and thereby increase the frictional contact between the ball and the arms.

Each arm is provided with means for engaging the respective surfaces of a dihedral to lock the clamp in position and to create the pressure necessary to grip the ball 9. The contacting means on each arm will be adjustable, and it is preferred to have the adjustment for the contacting means on one arm of a type which may be pre-set and on the other arm of a type capable of fine adjustment, to secure just the degree of tension necessary for proper installation.

As shown in the drawing, the lower arm 6 is provided with a contact member 13 which comprises a supporting leg 14 pivotally connected to the lower clamp arm 6. The arm 6 is provided with a longitudinally extending slot intermediate its side edges, through which the supporting leg may pass. A pivot pin 16 extends transversely through the clamp arm 6 and the supporting leg to pivotally mount the contact member on the clamp arm. As shown, the supporting leg, in the region of its pivotal connection to the clamp arm, has a sector-shaped projection 17 which is provided with a plurality of spaced openings 18, arranged on an arc about the pivot pin 16 as a center. Lower clamp arm 6 is provided with an opening 19, positioned to be in axial alignment with the various openings 18 in the supporting leg as the supporting leg is moved about its pivot 16. A locking pin 20 is provided for insertion in the opening 19 and a pre-selected opening 18 in the supporting leg, so that the leg may be locked in various pre-selected angular positions with respect to the clamp arm 6. When the clamp is to be placed in a wide dihedral, supporting leg 14 will be adjusted to a wide angle with respect to the clamp arm, and when the dihedral is a small angle, the angle between the clamp and the supporting leg will be proportionately reduced. The supporting leg carries a foot 21, for engagement with one face of the dihedral in which the clamp is to be placed, and the foot is preferably formed of a soft material to prevent marring the surface which it contacts.

The upper clamp arm 5 is provided with a pair of contact members 22. These members are spaced apart, to give lateral stability to the clamp when it is in position, and also to divide the pressure contact in the event the will of the dihedral against which these members are to bear is glass, such as an automobile windshield. This will substantially reduce the pressure exerted against the glass at any one point. Contact members 22 comprise screw threaded studs having surface engaging buttons, or feet, 24 at their outer ends. The threaded studs engage threaded openings in lugs 25. Each lug is pivotally attached, as at 26, to the inner face of one of the side members 10 of the upper clamp arm, so that they are free to rotate and the contact members may assume any angular position with respect to the upper clamp arm 5. This will ensure the contact members being at right angles to the surface which they are to engage. By means of this structure, the contact members 22 will always exert their pressure in a perpendicular direction, directly upon the surface against which they bear. By adjustment of the contact members, pressure against the ball 9 can be regulated.

In order to prevent the clamp from slipping out of the dihedral in which it is positioned, one of the clamp arms is provided with a projection which extends beyond the pivot 7, and terminates in a hook, or hooks, 27 for engagement with an opening, or eye member, at the apex of the dihedral. As shown, the hook projection extends from the lower arm 6 of the clamp and engages over the edge of the defrosting slot 28, located adjacent the juncture of the automobile dash and windshield.

When it is desired to secure an attachment such as a glare-shield in an automobile, the contact member 13 on the lower arm of the clamp is adjusted angularly, in accordance with the angle between the dash and windshield, and the pin 20 is inserted to lock the contact member in position. The ball 9 of the attachment is inserted between the arms of the clamp and seated in the recesses 8 and 12, and the contact members 22 carried by the upper arm 5 are rotated to adjust them outwardly into contact with the windshield. As the contact members 22 move outwardly, they cause the contact member 13 to be pressed against the dash, so that the clamp is held in position by means of the oppositely directed pressures of the respective contact members. This outward force will tend to move the arms of the clamp toward one another, which results in tight gripping of the ball which is between the arms. It will be obvious that the adjustment of the contact screws 22 may be such that the ball is gripped firmly, yet movable, between the arms of the clamp so that it may be adjusted to desired position. On the other hand, the contact members 22 may be adjusted to increase the pressure against the windshield, resulting in a tighter grip on the ball so that the ball will be immovable in the clamp.

Although the clamp may be used for holding many different attachments, a glare-shield which is particularly adapted for use with the clamp has been shown. The shield is supported upon a rod 29, which has one end rigidly secured within the ball 9. A bracket 30 is pivotally secured to the opposite end of the rod, as at 31, and has its other arm connected to a section 32 of the shield, by means of a pivot 33. The shield is formed of two sections, the section 34 being connected to the section 32 by means of a pivot 35. The sections 32 and 34 are so joined that they lie in longitudinal alignment when opened, and the outer section may be rotated around the pivot 35, so that the outer section will lie over, and within the outline of, the inner section 32. The pivotal connections 31 and 33 permit the shield universal movement with respect to the supporting rod, so that the shield may be readily adjusted to any desired position. Thus, it can be positioned to intercept reflections of the sun's rays from various metallic parts of the automobile, such as the radiator ornament or the windshield wiper blade arms. When not in use, the sections of the shield may be folded and the entire shield moved to a position substantially parallel with the supporting rod.

While in the above one practical embodiment of the invention has been disclosed, it will be obvious that the details of construction illustrated and described are merely by way of example and that the invention may take other forms within the scope of the appended claims.

What is claimed is:

1. A clamp for removably attaching and supporting articles within a dihedral formed by adjacent members comprising, a pair of arms connected at their ends for free pivotal movement relative to one another and adapted to receive and grip between their free ends a portion of the article to be supported, a contact member carried by one of the arms to bear against the surface of one of the members forming the dihedral, said contact member being adjustable toward and from the arm by which it is carried to pre-selected positions with respect to said arm, contact members carried by the other said arm to bear against the surfaces of the other member forming the dihedral and adjustable toward and from the arm which carries them to vary the pressure contact between the free ends of the arms and the article, and means at the end of said clamp adjacent the pivotal connection between the arms for releasable connection to one of the members forming said dihedral.

2. In a clamp as claimed in claim 1, each of said arms having a depression near its free end to seat a portion of the article to be supported.

3. In a clamp for attaching and supporting an article within a dihedral formed by adjacent members, a pair of arms connected at one end for free pivotal movement relative to one another and adapted to grip between their free ends a portion of the article to be supported, a contact arm pivotally connected to one of said arms and adapted to bear against one of the members forming said dihedral, means to lock the contact arm in pre-selected angular positions with respect to the arm which carries it to provide rough adjustment of the clamp to dihedrals of different angles, contact members carried by the other said clamp arm to bear against the other member forming the dihedral, said contact members having threaded connection with the clamp-arm upon which they are mounted for fine adjustment to determine the gripping pressure between said arms and the article supported thereby, and means connected to one of said clamp arms for releasable engagement with one of the members forming the dihedral to prevent movement of the clamp outwardly of the dihedral angle.

4. In a clamp as claimed in claim 3, each of said clamp arms being recessed near its free end to form a seat for the portion of the article gripped between said arms.

5. A clamp for removably attaching and supporting articles within a dihedral formed by adjacent members comprising a pair of arms connected at their ends for free pivotal movement relative to one another and adapted to receive and grip between their free ends a portion of the article to be supported, means carried by the arms to bear against confronting surfaces of the members forming the dihedral to urge the free ends of the arms toward one another into pressure contact with the portion of the supported article between them, and means at the end of said clamp adjacent the pivotal connection between said arms for releasable connection to one of the members forming said dihedral, said means carried by the arms being adjustable toward and from the arms to bear against the surfaces of dihedrals of different angles and to vary the pressure contact of the arms upon said article.

References Cited in the file of this patent

UNITED STATES PATENTS

| 811,514 | Mills | Jan. 30, 1906 |
| 1,576,037 | Colbert | Mar. 9, 1926 |
| 2,189,607 | Krische | Feb. 6, 1940 |
| 2,410,171 | Le Lande | Oct. 29, 1946 |